(12) United States Patent
Kreher et al.

(10) Patent No.: US 7,140,776 B2
(45) Date of Patent: Nov. 28, 2006

(54) SLIDER FOR A HOLDING TRACK OF A WINDOW LIFTER

(75) Inventors: Kárl-Heinz Kreher, Mühlheim (DE); Michael Gövert, Reinheim (DE)

(73) Assignee: ArvinMeritor GmbH, Dietzenbach (DE)

( * ) Notice: Subject to any disclaimer, the term of this patent is extended or adjusted under 35 U.S.C. 154(b) by 225 days.

(21) Appl. No.: 10/838,039

(22) Filed: May 3, 2004

(65) Prior Publication Data

US 2005/0008270 A1    Jan. 13, 2005

(30) Foreign Application Priority Data

Jul. 11, 2003    (DE) ................. 103 31 515

(51) Int. Cl.
 *F16C 33/00*    (2006.01)
 *E05F 11/38*    (2006.01)

(52) U.S. Cl. .................................. 384/42; 49/348

(58) Field of Classification Search ............ 384/7, 384/10, 20, 26, 37, 41, 42; 49/199, 206, 49/324, 345, 348, 352
See application file for complete search history.

(56) References Cited

U.S. PATENT DOCUMENTS

| | | | | |
|---|---|---|---|---|
| 2,236,449 A * | 3/1941 | Roethel | ................. | 49/144 |
| 5,038,519 A * | 8/1991 | Huebner | ................. | 49/375 |
| 5,058,322 A * | 10/1991 | Sambor | ................. | 49/352 |
| 5,784,832 A * | 7/1998 | LeeVan | ................. | 49/352 |
| 6,088,965 A * | 7/2000 | Fukumoto et al. | ........... | 49/352 |
| 6,604,325 B1 * | 8/2003 | Nicolai et al. | .............. | 49/348 |

\* cited by examiner

*Primary Examiner*—Richard Ridley
*Assistant Examiner*—James Pilkington
(74) *Attorney, Agent, or Firm*—Carlson, Gaskey & Olds

(57) ABSTRACT

A slider for a guide rail of a window lifter includes a guide section configured to be disposed in the guide rail, a sliding section configured to be disposed in the interior of a holding track for a windowpane and a connecting section linking the guide section and the sliding section. The guide section, sliding section, and connecting section are integrated together into a single unitary piece.

30 Claims, 3 Drawing Sheets

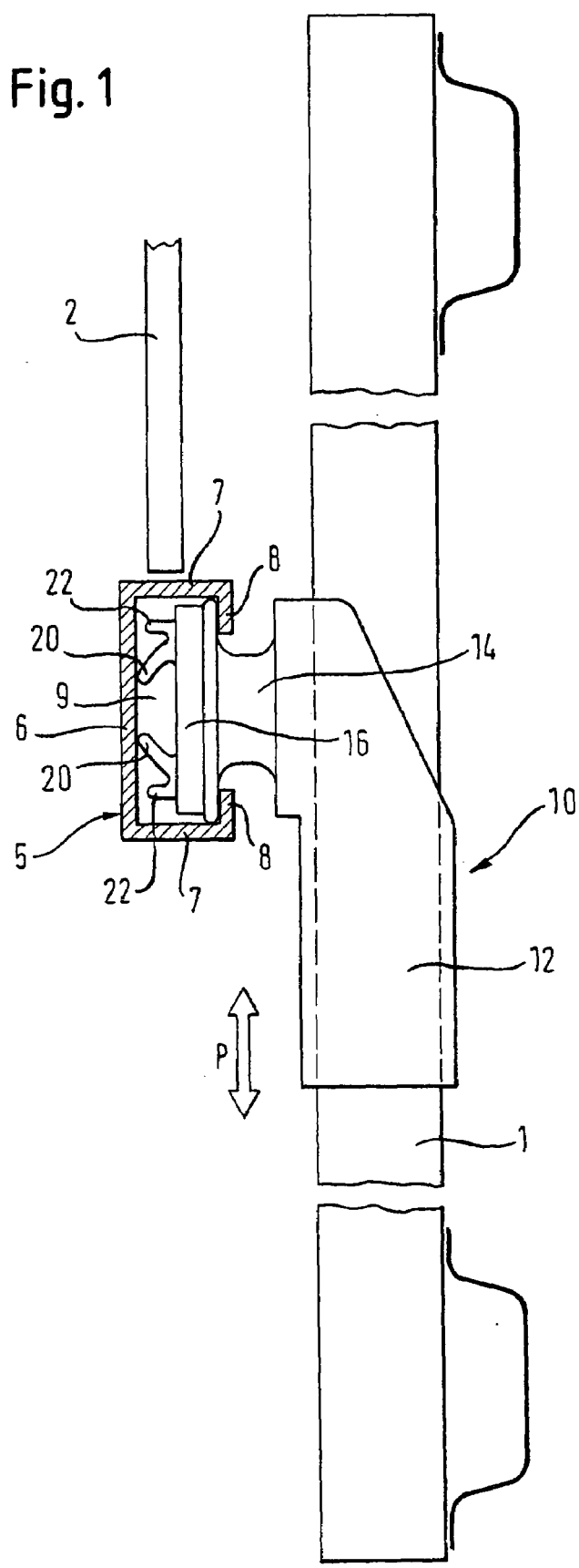

SLIDER FOR A HOLDING TRACK OF A WINDOW LIFTER

REFERENCE TO RELATED APPLICATIONS

The present invention claims the benefit of German Patent Application No. 103 31 515.2, filed Jul. 11, 2003.

TECHNICAL FIELD

The present invention relates to a slider for a guide rail of a window lifter, and more particularly to a slider having a guide section, which is to be arranged in a guide rail, a connecting section, and a sliding section, which is to be arranged in the interior of a holding track for a windowpane.

BACKGROUND OF THE INVENTION

Currently known window lifters often include a slider arranged in a guide rail. The slider may include a guide section arranged in the guide rail and a sliding section arranged in the interior of a holding track for a windowpane to be lifted and lowered. In some cases, the slider is provided especially for use in a cross-arm window lifter and essentially functions only to guide the windowpane in the y-direction with respect to the vehicle. For this purpose, the guide section of the slider is movably accommodated in the guide rail, which is mounted to be roughly vertical; the slider is therefore generally displaceable along the z-direction of the vehicle. The sliding section of the slider is mounted via the holding track on the windowpane to be moved such that the latter is guided in the guide rail in the y-direction and can be displaced in the z-direction. To prevent tension from building up between the windowpane and the guide rail when the windowpane is moved, a joint (e.g., a ball and socket joint) is provided in the sliders between the sliding section and the guide section.

Currently known sliders having a disadvantage of being made of comparatively many components. As a result, currently known sliders have high manufacturing and assembly costs. Moreover, the unavoidable manufacturing tolerances of the individual components can add up to an undesirably large overall tolerance after assembly, creating tolerance problems in the slider.

There is a desire for a more refined slider structure that results in lower manufacturing costs as well as smaller component tolerances.

SUMMARY OF THE INVENTION

The present invention is directed to a slider whose guide section, connecting section, and sliding section are integrated into a single unitary piece. As a result, the number of necessary components is reduced to the absolute minimum, namely to a single component. This unitary structure also creates fewer problems with respect to manufacturing tolerances because the component can be manufactured with great precision in a single die mold, for example, as a plastic extrusion piece.

According to one embodiment of the present invention, at least one spring element is disposed on the sliding section. The spring element can rest on an interior surface of the holding track in a spring-resilient manner so that the sliding section is guided in the holding track to allow tilting. In this way, the entire sliding section takes over the function of a ball-and-socket joint that is used in the prior art. Therefore, if during operation there is a difference between the orientation of the slider as set by the guide rail, on the one hand, and the orientation of the slider as set by the windowpane and therefore by the holding track, on the other hand, the sliding section and thus the slider as a whole can be tilted relative to the holding track. In this context, the spring element assures the necessary absence of play and eliminates rattling.

According to one embodiment of the present invention, four spring shackles are used as the spring element and are designed to be integral with the sliding section. The spring shackles protrude from the side of the sliding section that is facing away from the guide section.

According to a further embodiment, the spring element is a crowned spring insert that is accommodated on the sliding section. The crowned spring insert also makes it possible to allow a tilting motion of the sliding section and therefore of the entire slider relative to the rail, which is required for position compensating.

Advantageous embodiments of the present invention will become apparent in the subclaims.

BRIEF DESCRIPTION OF THE DRAWINGS

The present invention is described below on the basis of two preferred embodiments, which are illustrated in the attached drawings. In the latter, FIG. 1 in a schematic side view depicts a slider according to a first embodiment of the present invention.

DETAILED DESCRIPTION OF THE EMBODIMENTS

Figure 3:
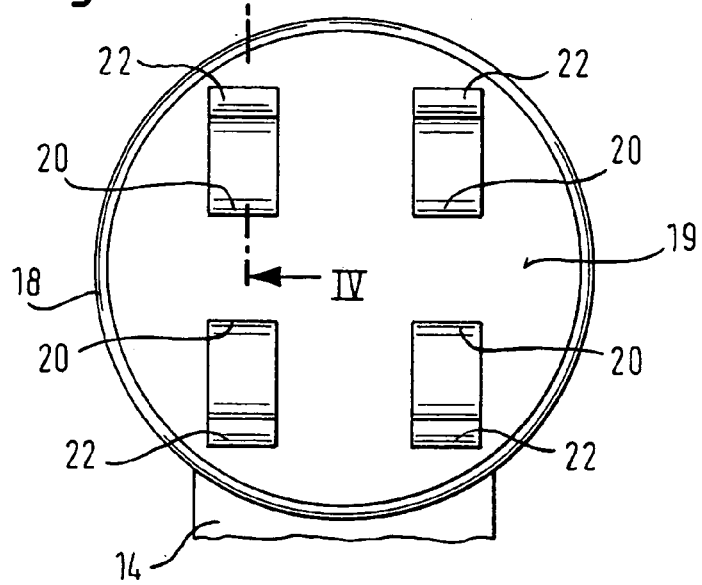
FIG. 3 depicts the slider according to the first embodiment in a cutaway top view.

FIGS. 1 through 4 show a slider 10 according to a first embodiment of the present invention. The slider 10 is movably accommodated in a guide rail 1, which is disposed in a generally vertical direction in a vehicle. The guide rail 1 functions to guide a windowpane 2, which can be moved in the direction of arrow P shown in FIG. 1. A holding track 5 is mounted on the windowpane 2. The holding track 5 has a generally C-shaped cross section with a base 6, two side walls 7, and two front walls 8. The base 6, the side walls 7, and the front walls 8 together enclose an interior space 9, which is accessible through a slot that extends between both of the front walls 8. The holding track 5 is oriented in a vehicle to be generally parallel to the x-direction of the vehicle. The mechanism of a window lifter apparatus (not shown) engages the holding track 5 or the windowpane 2 in order to move the windowpane 2 upward or downward.

The slider 10 is made up of a guide section 12, a connecting section 14, and a sliding section 16. The guide section 12 is movably accommodated by the guide rail 1. The sliding section 16 is movably disposed in the interior space 9 of the holding track 5. The sliding section is connected via the connecting section 14 to the guide section 12. The slider 10 is made of plastic, where the guide section 12, the connecting section 14, and the sliding section 16 of the slider 10 are configured together as a single piece.

Figure 2:
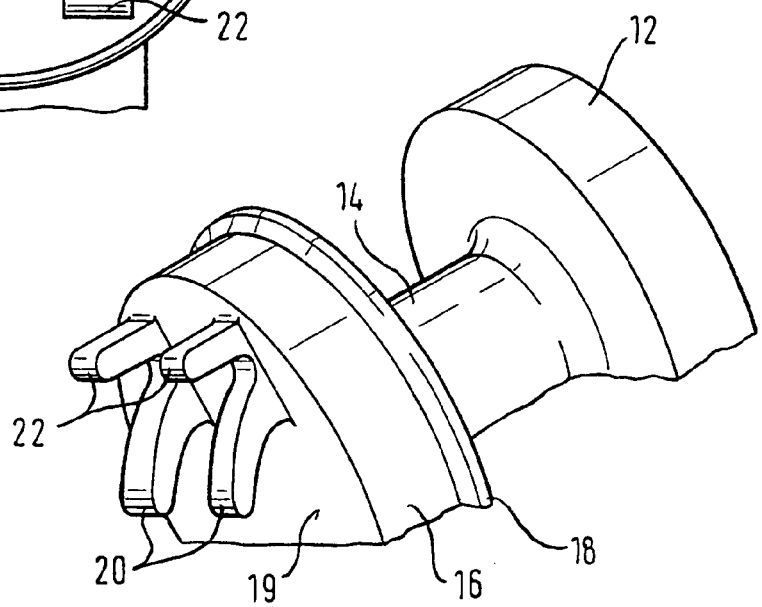
FIG. 2 depicts the slider according to the first embodiment in a cutaway perspective view.
Figure 4:
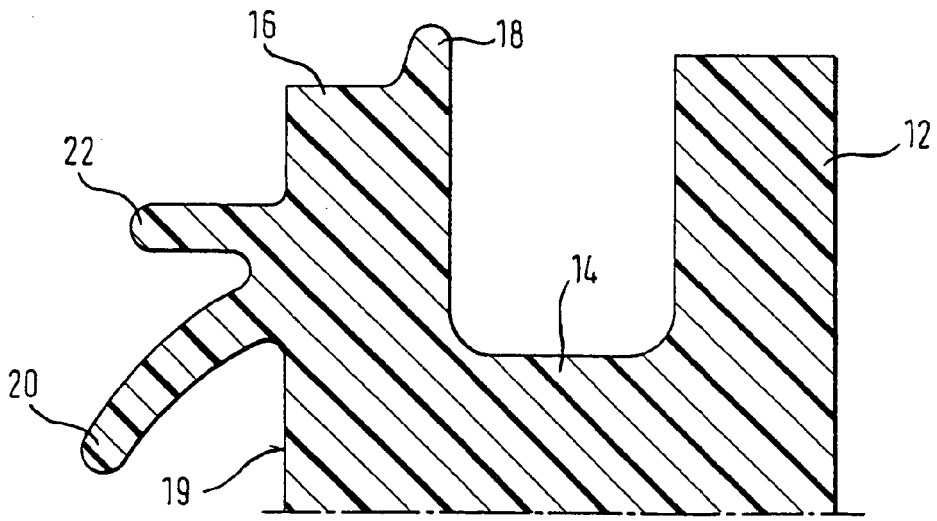
FIG. 4 depicts a cross-sectional view along the plane IV—IV from FIG. 3.
Figure 5:
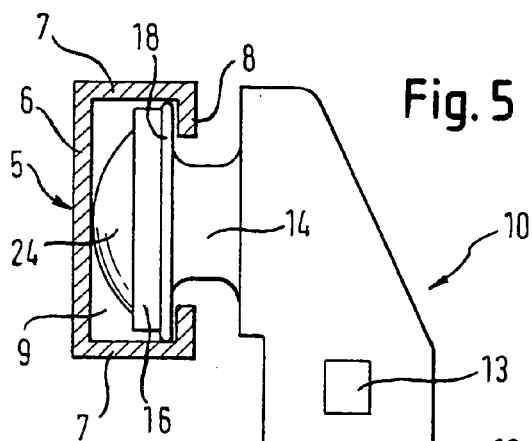
FIG. 5 in a schematic side view depicts a slider according to a second embodiment of the present invention.
Figure 6:
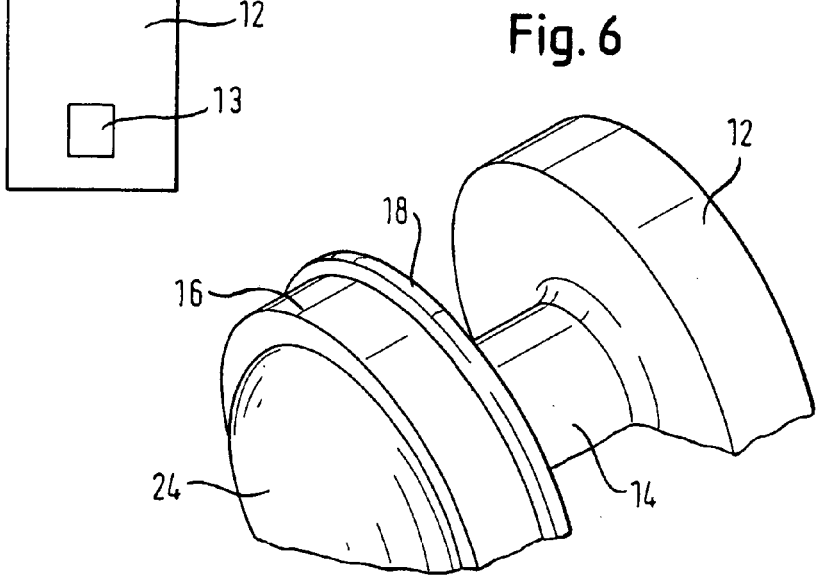
FIG. 6 depicts the slider according to the second embodiment in a cutaway perspective view.
Figure 7:
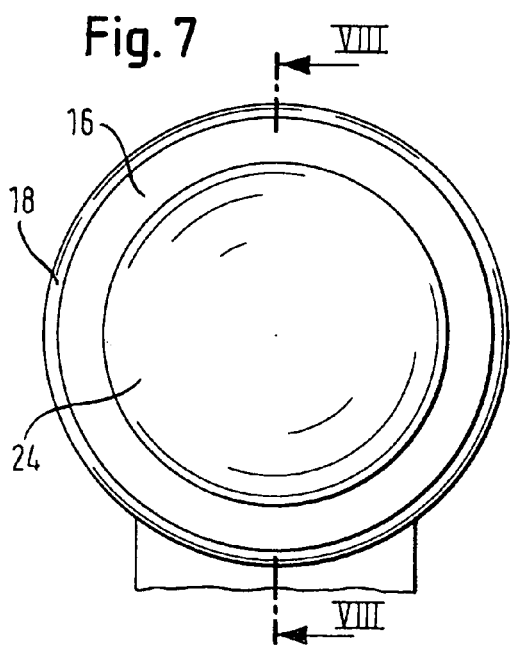
FIG. 7 depicts the slider according to the second embodiment in a cutaway top view.

In the embodiment shown in FIGS. 2 and 3, the sliding section 16 is generally configured in a disk-shaped manner with its central axis being oriented perpendicular to the base 6 of the holding track 5. A circumferential collar 18 is provided on the circumferential surface of the sliding section 16 on the edge facing the front walls 8 of the holding track 5. The circumferential collar 18 is dimensioned such that its diameter corresponds to the distance between the side walls 7 of the holding track 5. In one embodiment, the circumferential collar 18 has a rounded-off contour without sharply-defined edges.

In the embodiment shown in FIGS. 1 through 4, four spring elements configured as spring shackles 20 are disposed on a front end 19 of the sliding section 16 facing the base 6 of the holding track 5. The spring shackles 20 are configured in one piece with the sliding section 16 and are arranged in pairs opposite each other. In the illustrated embodiment, the spring shackles 20 are disposed on the front end 19 of the sliding section 16 in the corners of an imaginary rectangle. As can be seen in FIG. 2, each spring shackle 20 extends in a slightly curved fashion toward a symmetry plane that lies in the middle between the spring shackles 20. Four spacers 22 are arranged to immediately border the spring shackles 20 and are likewise configured in one piece with the sliding section 16 and therefore integrally connected into the single piece with the spring shackles 20. The spacers 22 are oriented generally perpendicular to the plane defined by the front end 19.

When the sliding section 16 is inserted into the holding track 5, the initial position of the slider 10 causes the slider 10 to be held in the position shown in FIG. 1 under the influence of the spring shackles 20. In this position, the rear side of the sliding section 16 facing away from the front end 19 rests equally on both of the front walls 8 of the holding track 5. During the operation of the window lifter, position tolerances result if the position of the slider 10 as set by the guide rail 1 does not agree with the position of the slider 10 indicated in FIG. 1, which is determined by the holding track 5 and the sliding section 16 that is engaged therein. To conduct the necessary compensation due to the position tolerances, the sliding section 16 is moved in a rotating, tilting and/or pushing motion in the interior of the holding track 5.

More particularly, if the slider 10 moves along the x-direction, the sliding section 16 is moved in the interior of the holding track 5. If the slider 10 is rotated relative to the holding track 5 about an axis that is perpendicular to the base 6, then the sliding section 16 rotates in the interior space 9 of the holding track 5. If the slider 10 is rotated about an axis that is perpendicular to the holding track 5 (i.e., the slider 10 is rotated clockwise or counterclockwise motion in the view shown FIG. 1), then the sliding section 16 in the interior of the holding track 5 tilts about an edge that is defined by the point of contact between the circumferential collar 18 and the corresponding side wall 7. In this context, the spring shackles 20, which are disposed opposite this tilting edge, are elastically pressed together. This ensures, even in the tilted state, that the slider 10 is accommodated to be free of play and therefore prevents any rattling.

In response to the tilting action, the spacers 22 assure that the spring shackles 20 are not pressed together too forcefully, and particularly not beyond their elastic range, thus preventing plastic deformation of the spring shackles 20. If the slider 10 is tilted about an axis perpendicular to both of the side walls 7, then the sliding section 16 in the interior space 9 of the holding track 5 is tilted about two tilting points, which are defined by the contact areas between the collar 18 and the interior edges facing each other of the front walls 8. In this context also, the result in each case is the elastic deformation of two of the spring shackles 20.

FIGS. 5 through 8 depict the slider 10 according to another embodiment of the present invention. For the components that are known from the first embodiment, the same reference numerals are used, and in this regard reference is made to the above explanations.

Figure 8:
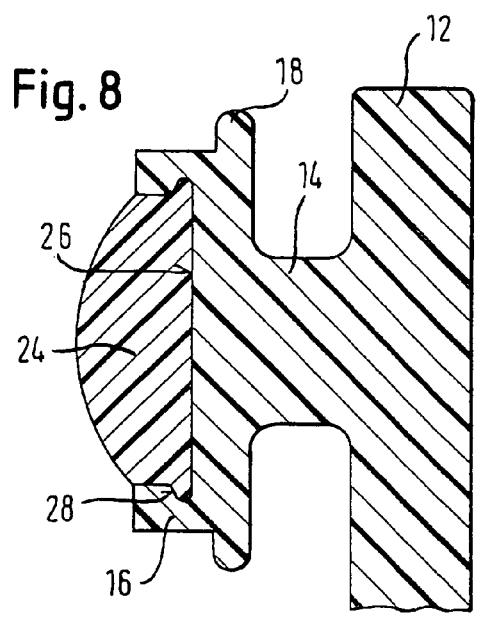
FIG. 8 depicts a cross-section along the plane VIII—VIII from FIG. 7.

The difference between the first and the second embodiments lies in the fact that in the second embodiment, a single spring element is used, namely, a crowned spring insert 24. A second difference lies in the fact that the spring insert 24, which functions as the spring element, is a separate part that is mounted on the sliding section 16 rather than an integrally formed part in the slider 10. The cushion-like spring insert 24 is made of a material that is softer than the material of the slider 10. In particular, the spring insert 24 is made of a material having excellent elastic spring qualities. To mount the spring insert 24 on the sliding section 16, the sliding section 16 has a recessed receiving space 26 that has an undercut anchoring groove 28. As shown in FIG. 8, the undercut anchoring groove 28 engages with an edge portion of the spring insert 24, such as the circumferential collar 18.

If the slider 10 is arranged in the holding track 5, then the apex area of the spring insert 24 rests on the base 6 of the holding track 5. In this state, the spring insert 24, like the spring shackles 20 of the first embodiment, is slightly biased so that the sliding section 16 is accommodated to be free of play and therefore prevents any rattling. If the slider 10 is tilted relative to the holding track 5, then the sliding section 16 in the interior of the holding track 5 swivels in the same way as in the first embodiment. The spring insert 24 therefore accomplishes the necessary spring action as well as a return action.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A slider for a guide rail of a window lifter having the guide rail and a holding track adapted to hold a windowpane, the slider comprising:
   a guide section configured to be arranged on the guide rail;
   a sliding section configured to be arranged in an interior of the holding track; and
   a connecting section connecting the guide section and the sliding section, wherein the guide section, the connecting section, and the sliding section are integrated together as a single unitary piece.

2. The slider as recited in claim 1, wherein the guide section, the sliding section, and the connecting section are made of plastic.

3. The slider as recited in claim 1, further comprising at least one spring element disposed on the sliding section, wherein the at least one spring element is resilient and rests on an interior surface of the holding track to guide the sliding section in the holding track in a tiltable manner.

4. The slider as recited in claim 3, wherein the at least one spring element is arranged on a side of the slider that is facing away from the guide section.

5. The slider as recited in claim 3, wherein the at least one spring element is a spring leg.

6. The slider as recited in claim 5, further comprising a spacer disposed on the sliding section adjacent to the spring leg, wherein the spacer is configured to selectively rest on the interior surface of the holding track to prevent deformation of the at least one spring element beyond an elastic range.

7. The slider as recited in claim 6, wherein the spacer is integrated with the sliding section as part of the single unitary piece.

8. The slider as recited in claim 5, wherein the spring leg is integrated with the sliding section in the single unitary piece.

9. The slider as recited in claim 5, wherein the spring leg comprises a plurality of spring legs.

10. The slider as recited in claim 9, wherein the plurality of spring legs comprises four spring legs that are arranged on corners of an imaginary rectangle on the sliding section.

11. The slider as recited in claim 3, wherein the at least one spring element is a crowned spring insert.

12. The slider as recited in claim 11, wherein the crowned spring insert is made of a plastic that is more flexible than a plastic used in the guide section, the sliding section, and the connecting section.

13. The slider as recited in claim 11, wherein the sliding section has an undercut that engages an edge portion of the crowned spring insert to hold the crowned spring insert to the sliding section.

14. The slider as recited in claim 1, wherein the sliding section includes a circumferential collar that functions as a guide for the sliding section in the holding track.

15. The slider as recited in claim 1, wherein the guide section, the sliding section, and the connecting section are all integrally formed together as the single unitary piece to provide a reduced overall manufacturing tolerance range for the slider.

16. A window lifter system, comprising:
a guide rail;
a holding track adapted to hold a windowpane; and
a slider having a guide section arranged on guide rail, a sliding section arranged in an interior of the holding track, and a connecting section connecting the guide section and the sliding section,
wherein the guide section, the connecting section, and the sliding section are integrated together as a single unitary piece.

17. The system as recited in claim 16, wherein the guide section, the sliding section, and the connecting section are made of plastic.

18. The system as recited in claim 16, further comprising at least one spring element disposed on the sliding section, wherein the at least one spring element is resilient and rests on an interior surface of the holding track to guide the sliding section in the holding track in a tiltable manner.

19. The system as recited in claim 18, wherein the at least one spring element is arranged on a side of the slider that is facing away from the guide section.

20. The system as recited in claim 18, wherein the at least one spring element is a spring leg.

21. The system as recited in claim 20, further comprising a spacer disposed on the sliding section adjacent to the spring leg, wherein the spacer selectively rests on the interior surface of the holding track to prevent deformation of the at least one spring element beyond an elastic range.

22. The system as recited in claim 21, wherein the spacer is integrated with the sliding section as part of the single unitary piece.

23. The system as recited in claim 20, wherein the spring leg is integrated with the sliding section in the single unitary piece.

24. The system as recited in claim 20, wherein the spring leg comprises a plurality of spring legs.

25. The system as recited in claim 24, wherein the plurality of spring legs comprises four spring legs that are arranged on corners of an imaginary rectangle on the sliding section.

26. The system as recited in claim 18, wherein the at least one spring element is a crowned spring insert.

27. The system as recited in claim 26, wherein the crowned spring insert is made of a plastic that is more flexible than a plastic used in the guide section, the sliding section, and the connecting section.

28. The system as recited in claim 26, wherein the sliding section has an undercut that engages an edge portion of the crowned spring insert to hold the spring insert to the sliding section.

29. The system as recited in claim 16, wherein the sliding section includes a circumferential collar that guides the sliding section in the holding track.

30. The system as recited in claim 16, wherein the guide section, the sliding section, and the connecting section are all integrally formed together as the single unitary piece to provide a reduced overall manufacturing tolerance range for the slider.

* * * * *

UNITED STATES PATENT AND TRADEMARK OFFICE
CERTIFICATE OF CORRECTION

| | | |
|---|---|---|
| PATENT NO. | : 7,140,776 B2 | Page 1 of 1 |
| APPLICATION NO. | : 10/838039 | |
| DATED | : November 28, 2006 | |
| INVENTOR(S) | : Kreher et al. | |

It is certified that error appears in the above-identified patent and that said Letters Patent is hereby corrected as shown below:

Claim 16, Column 5, line 41: Insert --the-- after "on" and before the second occurrence of "guide"

Signed and Sealed this

Twenty-seventh Day of February, 2007

JON W. DUDAS
*Director of the United States Patent and Trademark Office*